US008510106B2

(12) United States Patent
Li et al.

(10) Patent No.: US 8,510,106 B2
(45) Date of Patent: Aug. 13, 2013

(54) METHOD OF ELIMINATING BACKGROUND NOISE AND A DEVICE USING THE SAME

(75) Inventors: Hai Li, Shenzhen (CN); Kunping Xu, Shenzhen (CN); Lizhen Zhang, Shenzhen (CN); Yun Yang, Shenzhen (CN); Wei Feng, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 926 days.

(21) Appl. No.: 12/613,510

(22) Filed: Nov. 5, 2009

(65) Prior Publication Data

US 2010/0262424 A1 Oct. 14, 2010

(30) Foreign Application Priority Data

Apr. 10, 2009 (CN) .......................... 2009 1 0106632

(51) Int. Cl.
*G10L 21/00* (2006.01)
*G10L 21/02* (2006.01)
*H04B 15/00* (2006.01)
*G10L 15/20* (2006.01)

(52) U.S. Cl.
USPC ........................... 704/226; 704/233; 381/94.1

(58) Field of Classification Search
USPC ................. 704/200, 205–210, 214–218, 224, 704/226–228, 233, E21.001–E21.02; 381/71.1–71.14, 94.1–94.9, 104–109, 110
See application file for complete search history.

(56) References Cited

U.S. PATENT DOCUMENTS 3,855,423 A * 12/1974 Brendzel et al. .............. 708/323
3,920,931 A * 11/1975 Yanick, Jr. .................... 381/321
4,277,645 A * 7/1981 May, Jr. ........................ 704/233
4,539,692 A * 9/1985 Munter ......................... 375/345
4,589,131 A * 5/1986 Horvath et al. ............... 704/214

(Continued)

FOREIGN PATENT DOCUMENTS

CN 1115528 A 1/1996
CN 1245376 A 2/2000

(Continued)

OTHER PUBLICATIONS

Ben Aicha, A.; Ben Jebara, S., "Comparison of Three Methods of Eliminating Musical Tones in Speech Denoising Subtractive Techniques," Electronics, Circuits and Systems, 2006. ICECS '06. 13th IEEE International Conference on , vol., No., pp. 652,655, Dec. 10-13, 2006.*

(Continued)

*Primary Examiner* — Pierre-Louis Desir
*Assistant Examiner* — David Kovacek
(74) *Attorney, Agent, or Firm* — Morgan Lewis & Bockius LLP

(57) ABSTRACT

The present invention provides a method of eliminating background noise and a device using the same. The method of eliminating background noise comprises the steps of: detecting an effective value of a received audio signal, and generating an average power signal of the received audio signal; generating a noise eliminating control signal by comparing the average power signal with a first threshold; and eliminating the noise, and amplifying the voice signal using the noise eliminating control signal. A device of eliminating background noise comprises a detecting unit, which is configured to detect an effective value, and generate an average power signal of the received audio signal; a first signal generating unit, which is configured to generate a noise eliminating control signal; and an amplifying unit, which is configured to eliminate the noise, and amplify the voice signal.

14 Claims, 8 Drawing Sheets

(56) References Cited

U.S. PATENT DOCUMENTS 4,628,529 A * 12/1986 Borth et al. .................. 381/94.3
4,747,143 A * 5/1988 Kroeger et al. ............... 704/225
5,003,391 A * 3/1991 Peters et al. .................. 348/501
5,185,806 A * 2/1993 Dolby et al. .................. 381/106
5,471,527 A * 11/1995 Ho et al. ....................... 379/347
5,473,702 A * 12/1995 Yoshida et al. .............. 381/94.7
5,668,871 A * 9/1997 Urbanski ................. 379/406.07
5,687,285 A 11/1997 Katayanagi et al.
5,706,394 A * 1/1998 Wynn ............................ 704/219
5,752,226 A * 5/1998 Chan et al. .................... 704/233
5,771,486 A 6/1998 Chan et al.
5,781,640 A * 7/1998 Nicolino, Jr. ................ 381/73.1
5,872,852 A * 2/1999 Dougherty ...................... 381/57
5,937,377 A * 8/1999 Hardiman et al. ............ 704/225
6,037,993 A * 3/2000 Easley .......................... 348/485
6,094,490 A * 7/2000 Kim ............................. 381/94.5
6,169,971 B1 * 1/2001 Bhattacharya ................ 704/225
6,202,046 B1 * 3/2001 Oshikiri et al. ............... 704/233
6,208,845 B1 * 3/2001 Yoshida ..................... 455/114.2
6,359,992 B1 * 3/2002 Preves et al. .................. 381/312
6,360,203 B1 * 3/2002 Prince ........................... 704/270
6,381,570 B2 * 4/2002 Li et al. ......................... 704/233
6,415,253 B1 * 7/2002 Johnson ........................ 704/210
6,556,685 B1 * 4/2003 Urry et al. .................... 381/94.1
6,577,997 B1 * 6/2003 Gong ............................ 704/252
6,950,796 B2 * 9/2005 Ma et al. ....................... 704/244
6,990,194 B2 * 1/2006 Mikesell et al. ......... 379/406.04
7,167,828 B2 * 1/2007 Ehara ............................ 704/223
7,209,567 B1 * 4/2007 Kozel et al. .................. 381/94.3
7,295,976 B2 * 11/2007 Domer et al. ................. 704/233
7,457,757 B1 * 11/2008 McNeill et al. ............... 704/500
7,711,557 B2 * 5/2010 Ozawa .......................... 704/226
2002/0051546 A1 * 5/2002 Bizjak ........................... 381/106
2002/0116186 A1 * 8/2002 Strauss et al. ................. 704/233
2003/0053640 A1 * 3/2003 Curtis et al. ................. 381/94.3
2003/0198328 A1 10/2003 Li
2004/0057586 A1 * 3/2004 Licht ............................ 381/94.7
2005/0249355 A1 * 11/2005 Chen et al. ................. 381/71.14
2006/0013412 A1 * 1/2006 Goldin ......................... 381/94.1
2006/0178876 A1 * 8/2006 Sato et al. ..................... 704/225
2009/0192803 A1 * 7/2009 Nagaraja et al. .............. 704/278
2009/0216530 A1 * 8/2009 Fallat et al. ................... 704/233
2009/0220107 A1 * 9/2009 Every et al. .................. 381/94.7
2009/0262969 A1 * 10/2009 Short et al. .................... 381/370
2010/0020986 A1 * 1/2010 Nemer et al. ................ 381/94.1
2010/0262424 A1 * 10/2010 Li et al. ......................... 704/233

FOREIGN PATENT DOCUMENTS

CN 1300417 A 6/2001
CN 1473321 A 2/2004
CN 101079266 A 11/2007

OTHER PUBLICATIONS

International Search Report, PCT/CN2010/071334, Jul. 1, 2010, 4 pgs.

* cited by examiner

METHOD OF ELIMINATING BACKGROUND NOISE AND A DEVICE USING THE SAME

CROSS-REFERENCE TO RELATED APPLICATION

This application claims priority to and benefit of Chinese Patent Application Serial No. 200910106632.5, filed in the State Intellectual Property Office of the P. R. China on Apr. 10, 2009, the entire contents of which are incorporated herein by reference.

BACKGROUND OF THE INVENTION

1. Field of the Invention

The present invention relates to a speech communication field, in particular, relates to a device to eliminate audio signal background noise and a method using the same.

2. Background of the Related Art

In the field of speech communication, due to the noisy background around a speaker, audio signals collected by the audio device include not only the voice signal but also the noise generated by other sound sources, such as sounds from other people and the vehicles. Such noise severely influences the speech communication quality. Therefore, a technology to eliminate the background noise in the audio signals with fewer devices has become the research and developing focus of many companies.

SUMMARY OF THE INVENTION

The present invention provides a method to eliminate audio signal background noise, which comprises steps of:

(a) detecting an effective value of a received audio signal, and generating an average power signal of the received audio signal, wherein the receive audio signal includes noise and a voice signal;

(b) generating a noise eliminating control signal by comparing the average power signal with a first threshold; and (c) eliminating the noise in the received audio signal, and amplifying the voice signal in the received audio signal using the noise eliminating control signal;

wherein the first threshold is determined based on the difference between a voice signal average power and noise average power.

In some embodiment, the present invention provides a device to eliminate audio signal background noise, which comprises:

a detecting unit, which is configured to detect an effective value of a received audio signal, and generate an average power signal of the received audio signal, wherein the receive audio signal includes noise and a voice signal;

a first signal generating unit, which is configured to generate a noise eliminating control signal by comparing the average power signal with a first threshold; and an amplifying unit, which is configured to eliminate the noise in the received audio signal, and amplify the voice signal in the received audio signal using the noise eliminating control signal;

wherein the first threshold depends on the difference between a voice signal average power and a noise average power.

In some embodiments of the present invention, the average power signal of the audio signal is obtained by detecting an effective value of the received audio signal; and the noise eliminating control signal is generated by comparing the average power signal of the audio signal with the first threshold. The noise of the audio signal is eliminated and the voice signal of the audio signal is amplified, thus the background noise of the received audio signal is eliminated effectively.

BRIEF DESCRIPTION OF THE DRAWINGS

The foregoing and other features and advantages of the invention will be better understood from the following detailed description of preferred embodiments of this invention when taken conjunction with the accompanying drawings in which.

DETAILED DESCRIPTION OF THE EMBODIMENTS

The aforementioned features and advantages of the invention as well as additional features and advantages thereof will be more clearly understood hereafter as a result of a detailed description of the following embodiments when taken conjunction with the drawings.

In some embodiments of the present invention, the average power signal of the audio signal is obtained by detecting an effective value of a received audio signal; the noise eliminating control signal is generated by comparing the average power signal of the audio signal with a first threshold. The background noise of the received audio signal is eliminated effectively by eliminating the noise and amplifying the voice signal of the audio signal.

Figure 1:
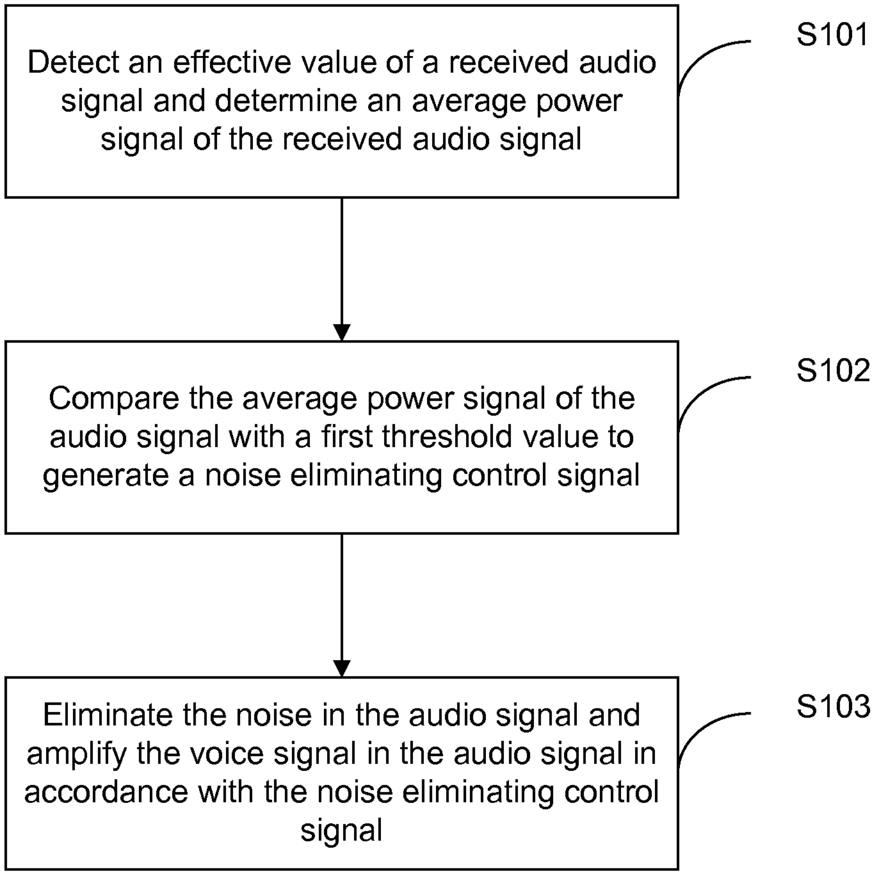
FIG. 1 is a flow chart of a method of eliminating audio signal background noise in some embodiments of the present invention.

FIG. 1 shows a flow chart of a method of eliminating background noise from an audio signal in some embodiments of the present invention.

In step S101, the average power signal of an audio signal is obtained by detecting an effective value (also known as Root Mean Square value, RMS value) for the received audio signal.

In some embodiments of the present invention, the received audio signal is local-sampled with an audio device or transmitted from other devices. In a noisy environment, there are many sound sources in addition to a speaker's voice, such as sounds from other people and the vehicles. Therefore, the audio signal collected by the audio device not only includes the speaker's voice signal, but also includes the noise generated by other sound sources.

The received audio signal includes a voice signal and noise, and the amplitude of the voice signal is different from the amplitude of the noise. An average power signal of the received audio signal is generated by detecting the effective value of the received audio signal based on the amplitude change of the audio signal. Therefore, the average power signal reflects the amplitude change of the audio signal. A first threshold is determined based on the difference between the average power of the voice signal and the average power of the noise. The first threshold is then compared with the average power signal of the received audio signal, and a determination is made to determine whether the received audio signal is a voice signal or noise. A noise eliminating control signal is generated based on the determination result.

The audio signal is normally continuous, while detecting the effective value of the audio signal may have time delay. To overcome the inaccuracy due to the time delay, one embodiment of the present invention provides steps of:

Step A: determine whether the received audio signal is a voice signal, and generate a trigger signal for detecting the effective value based on the determination and the noise eliminating control signal generated in a preceding noise elimination cycle. When the trigger signal requires the detection of the effective value, step B is executed; otherwise, step C is executed. The detailed steps are described as follows.

Step A1: compare the received audio signal with a second threshold to determine whether the audio signal is the voice signal, and obtain a forward comparison result.

Wherein, the second threshold is the minimum value of the forward voice signal, and the detailed setting of the second threshold depends on the microphone sensitivity, and the collecting situations at different sound pressure noise levels under such microphone sensitivity. The detailed setting of the second threshold should also consider the acoustic theory and experimental statistics. When comparing the received audio signal with the second threshold, the audio signal is determined to be a voice signal if the audio signal is larger than the second threshold, and the forward comparison result is set to be logic true, the audio signal is determined to be the noise if the audio signal is less than or equal to the second threshold, and the forward comparison result is set to be logic false.

Step A2: compare the received audio signal with a third threshold to determine if the audio signal is the voice signal, and obtain an inverse comparison result.

Wherein, the third threshold is the maximum value of the inverse voice signal, and the detailed setting of the third threshold depends on the microphone sensitivity, and the collecting condition at different sound pressure noises based on the microphone sensitivity. The detailed setting of the third threshold should also consider acoustic theory and experimental statistics. When comparing the received audio signal with the third threshold, if the audio signal is less than or equal to the third threshold, the audio signal is determined to be the voice signal, and the inverse comparison result is set to be logic true; if the audio signal is larger than the third threshold, the audio signal is determined to be the noise, and the inverse comparison result is set to be logic false.

Step A3: process the forward comparison result and the inverse comparison result to determine if the audio signal is the voice signal using logic OR.

In some embodiment of the present invention, whether the received audio signal is the voice signal is determined by processing the forward comparison result and the inverse comparison result using the logic OR operation. When one of the forward comparison result and the inverse comparison result is logic true, the logic OR processing result is logic true, the audio signal is determined to be the voice signal and the output is set to be logic true; when both the forward comparison result and the inverse comparison result are logic false, the logic OR processing result is logic false, and the audio signal is determined to be the noise and the output is set to be logic false.

Step A4: process the result of Step A3 and the noise eliminating control signal generated in a preceding elimination cycle, and generate a trigger signal for detecting the effective value.

In some embodiment of the present invention, the result of Step A3 and the noise eliminating control signal generated in a preceding elimination cycle are processed using the logic OR operation. When one of the result of Step A3 and the noise eliminating control signal is logic true, the effective value detection is determined to be necessary and the trigger signal is output as logic true; when both the result of Step A3 and the noise eliminating control signal are logic false, the effective value detection is determined to be not necessary, and the trigger signal is output as logic false.

To improve the accuracy and eliminate the detecting error for the audio signal when the amplitude of the audio signal is small, another embodiment of the present invention further comprises a step of pre-amplifying the received audio signal before determining whether the received audio signal is the voice signal.

Step B: detect the effective value of the received audio signal based on the trigger signal, and generate the average power signal. The effective value detection method is well known to those skilled in the art, thus is not described in detail herein with.

Step C: maintain the initial value of the average power signal without detecting the effective value. Wherein, the initial value is used to reflect the average power of the noise of the audio signal.

In some embodiment of the present invention, within the noise bandwidth, the average power signal with initial value is maintained by detecting the effective value for the voice signal of the audio signal. Thus, in some specific circuit design, it prevents the effective value detection part from delaying at the beginning of the detection, i.e. the output detected effective value is less than the true value. Further, it outputs a constant value under the noise background and saves power consumption.

Step S102 compares the average power signal with a first threshold to generate a noise eliminating control signal.

In some embodiment of the present invention, a critical value between the average power of the voice signal and the average power of the noise is set as a first threshold, i.e., determining whether the audio signal is a voice signal or noise by comparing the average power signal with the first threshold, and generating the noise eliminating control signal.

To provide a better quality voice signal, in another embodiment of the present invention, the step of comparing the average power signal of the audio signal with a first threshold comprises steps of:

Step A: compare the average power signal of the audio signal with a fourth threshold to extract a first control signal.

Wherein the fourth threshold is mainly used to detect the effective voice signal, i.e., to set noise threshold. The detailed setting of the fourth threshold depends on the microphone sensitivity, and the collecting condition at different sound pressure noises based on the microphone sensitivity. The detailed setting of the fourth threshold should also consider acoustic theory and experimental statistics. In this embodiment of the present invention, if the effective voice signal is detected, then the output is logic true; if the effective voice signal is not detected, then the output is logic false.

Step B: compensate the first control signal to obtain a second control signal.

Step C: compare the average power signal of the audio signal with a fifth threshold to extract a third control signal for an excessive signal.

Wherein the fifth threshold is mainly used to detect the effective voice signal, i.e., to set noise threshold. The detailed setting of the fifth threshold depends on microphone sensitivity and collecting condition for different sound pressure noise based on the microphone sensitivity. The detailed setting of the fifth threshold should also consider acoustic theory and experimental statistics. In this embodiment of the present invention, if the excessive voice signal is detected, then the output is logic true; if the excessive voice signal is not detected, then the output is logic false.

Step D: process the second control signal and the third control signal to generate the noise eliminating control signal using the exclusive OR operation.

In some embodiment of the present invention, when processing the second control signal and the third control signal, if the logic value of the second control signal is different from the logic value of the third control signal, then the output is logic true; if the logic value of the second control signal is the same as the logic value of the third control signal, then the output is logic false. When both the second control signal and the third control signal are logic true, both an effective voice signal and an excessive audio signal are detected. The noise eliminating control signal is output as logic false. When both the second control signal and the third control signal are logic false, neither an effective voice signal nor an excessive audio signal is detected. The noise eliminating control signal is output as logic false. When the second control signal is logic true and the third control signal is logic false, an effective voice signal is detected and no excessive audio signal is detected. The noise eliminating control signal is output as logic true. When the second control signal is logic false and the third control signal is logic true, an excessive audio signal is detected and no effective voice signal is detected. The noise eliminating control signal is output as logic true.

Step S103 eliminates the noise of the audio signal and amplifies the voice signal of the audio signal using the noise eliminating control signal.

In some embodiment of the present invention, when the noise eliminating control signal is logic true, the audio signal is amplified. When the noise eliminating control signal is logic false, the noise of the audio signal is eliminated and the voice signal of the audio signal is amplified. Thus, the background noise is effectively eliminated. There are many ways to eliminate the noise of the audio signal and to amplify the voice signal of the audio signal, for example, amplifying the audio signal to pre-determined time or prohibiting the audio signal from generating using the noise eliminating control signal; performing phase process to the audio signal to eliminate the noise and amplify the voice signal using the noise eliminating control signal, etc.

An excessive audio signal normally exists in the collected audio signal, which causes the listener to feel uncomfortable. To solve this problem, in some embodiment of the present invention, before step S103, the background noise eliminating method further comprises a step of comparing the average power signal of the audio signal with a sixth threshold to generate an attenuation control signal. The attenuation control signal is used to attenuate the excessive audio signal appropriately.

Wherein the value of the sixth threshold is the maximum power of a pre-determined audio signal. In some embodiment of the present invention, when the average power signal of the audio signal is larger than the value of the sixth threshold, the output attenuation control signal is logic true, and the attenuation control signal is used to attenuate the received audio signal to reduce the excessive audio signal appropriately; when the average power signal of the audio signal is less than or equal to the value of the sixth threshold, the output attenuation control signal is logic false, and the attenuation control signal does not attenuate the received audio signal.

The attenuation control signal is used to control the received audio signal for inverse phase amplification in different ratios, thus to reduce the excessive audio signal appropriately.

In some embodiment of the present invention, when the volume of the audio signal is within a normal range, the received audio signal is inverse phase amplified in equal amplitude using the attenuation control signal, and an inversed phase amplification signal is obtained, i.e., the amplitude of the audio signal is not processed. When the volume of the audio signal exceeds the normal range, the received excessive audio signal is attenuated in a certain ratio to reduce the excessive audio signal appropriately, and the inversed phase amplification signal is obtained.

Therefore, using the noise eliminating control signal, the noise of the received audio signal is eliminated and the voice signal of received audio signal is amplified.

Figure 2:
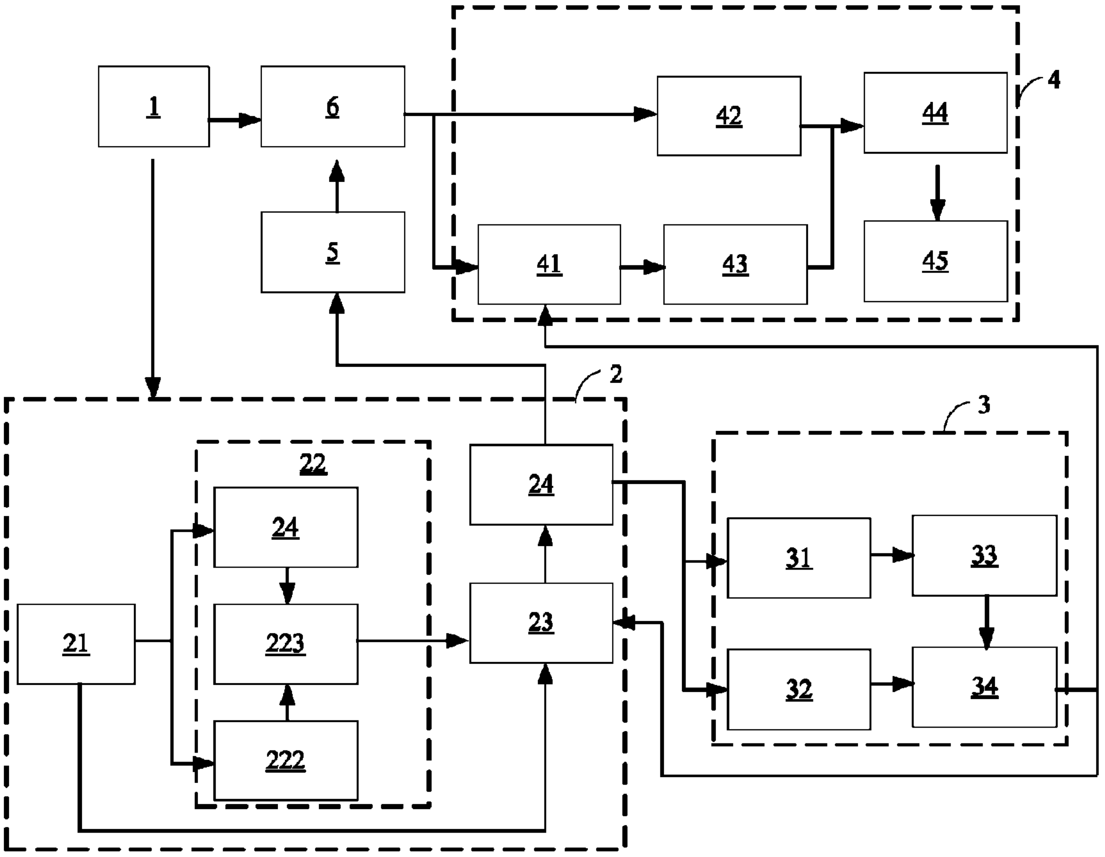
FIG. 2 is a structure diagram of a device of eliminating audio signal background in some embodiments of the present invention.

FIG. 2 shows a structure of background noise eliminating device in some embodiments of the present invention. FIG. 2 shows the components relevant to the embodiments of the present invention, which comprises:

A detecting unit 2 to detect the effective value of a received audio signal, and generate an average power signal of an audio signal. The detecting unit 2 comprises a voice signal determining circuit 22, an effective value detecting control circuit 23 and an effective value detecting circuit 24.

The voice signal determining circuit 22 determines if the received audio signal is a voice signal. In some embodiment of the present invention, to improve the determination accuracy, the voice signal determining circuit 22 comprises a forward voice signal determining module 221, an inverse voice signal determining module 222 and a first logic processing module 223.

Wherein the forward voice signal determining module 221 is configured to compare the received audio signal with a second threshold to determine if the audio signal is the voice signal, thus to obtain a forward comparison result.

Wherein the second threshold is the minimum value of the forward voice signal, and the detailed setting of the second threshold depends on microphone sensitivity and collecting condition for different sound pressure noise based on the microphone sensitivity, and the detailed setting of the second threshold should combine with acoustic theory and experiment statistics. When comparing the received audio signal with the second threshold, if the audio signal is larger than the second threshold, the audio signal is determined to be a voice signal, and the forward comparison result is logic true; if the audio signal is less than or equal to the second threshold, the audio signal is determined to be noise and the forward comparison result is logic false.

The inverse voice signal determining module 222 is configured to compare the received audio signal with a third threshold, and determine if the audio signal is a voice signal, thus to obtain an inverse comparison result.

Wherein the third threshold is the maximum value of the inverse voice signal, and the detailed setting of the third threshold depends on microphone sensitivity and collecting condition for different sound pressure noise based on the microphone sensitivity, and the detailed setting of the third threshold should combine with acoustic theory and experimental statistics. When comparing the received audio signal with the third threshold, if the audio signal is less than or equal to the third threshold, the audio signal is determined to be a voice signal, and the inverse comparison result is logic true; if the audio signal is larger than the third threshold, the audio signal is determined to be noise and the inverse comparison result is logic false.

The first logic processing module 223 is configured to process the forward comparison result and the inverse comparison result using logic OR, and determine if the audio signal is a voice signal.

In some embodiment of the present invention, whether the received audio signal is the voice signal is determined by processing the forward comparison result and the inverse comparison result using logic OR. When one of the forward comparison result and the inverse comparison result is logic true, the logic OR result is logic true, and the audio signal is determined to be a voice signal. When both the forward comparison result and the inverse comparison result are logic false, the logic OR result is logic false, and the audio signal is determined to be noise.

The detecting control circuit 23 is configured to process the logic OR result output by the first logic processing module 223 and the noise eliminating control signal generated in a preceding elimination cycle, and generate the trigger signal for detecting the effective value.

In some embodiment of the present invention, whether it is necessary to detect the effective value of the received audio signal is determined by processing the processed logic OR result and the noise eliminating control signal in a preceding elimination cycle. When one of the processed logic OR result and the above generated noise eliminating control signal is logic true, it is determined to be necessary to detect the effective value. When both the processed logic OR result and the noise eliminating control signal in a preceding elimination cycle are logic false, it is determined to be unnecessary to detect the effective value.

The effective value detection circuit 24 detects the effective value for the received audio signal, and generates the average power signal of the audio signal; or does not detect the effective value to maintain the output signal with an initial value. Wherein, the initial value is configured to reflect the average power of the noise of the audio signal.

In some embodiment of the present invention, within the noise bandwidth, the output signal with the initial value is maintained by detecting the effective value for the voice signal of the audio signal. Thus in the specific circuit design, it prevents the effective value detection part from delaying at the beginning of detecting, i.e. the detected effective value is less than the true value; and further it outputs a constant value under the noise condition and saves power consumption.

To improve the processing accuracy and eliminate detection error for the audio signal when the amplitude of the audio signal is small, in another embodiment of the present invention, the background noise eliminating device further comprises a signal pre-amplifying circuit 21. The input terminal of the signal pre-amplifying circuit 21 is connected to an audio collection unit 1; and the output terminals of the signal pre-amplifying circuit 21 are connected to the forward voice signal determining module 221, the inverse voice signal determining module 222 and the effective value detection circuit 24, respectively. The signal pre-amplifying circuit 21 is used to pre-amplify the received audio signal. Wherein, the forward voice signal determining module 221 compares the pre-amplified audio signal with the second threshold to determine if the audio signal is a voice signal, thus to obtain a forward comparison result; the inverse voice signal determining module 222 compares the pre-amplified audio signal with the third threshold to determine if the audio signal is a voice signal, thus to obtain an inverse comparison result; the effective value detection circuit 24 detects the effective value for the audio signal output from the signal pre-amplifying circuit 21, and generates the average power signal of the audio signal. In another embodiment of the present invention, the effective value detection circuit 24 does not detect the effective value for the received audio signal to maintain the output signal with the initial value.

The background around a speaker is noisy. There are many sound sources in addition to the speaker's voice, such as sounds from other people and the vehicles. Therefore, the audio signal collected by the audio device not only includes the voice signal of the speaker, but also includes the noise generated by other sound sources.

In some embodiment of the present invention, the received audio signal may be the collected audio signal or the audio signal transmitted by other devices. When the received audio signal is the collected audio signal, the background noise eliminating device further comprises an audio collection unit 1. The audio collection unit 1 collects audio signal, wherein the audio signal includes voice signal and noise. The specific circuit structure of the audio collection unit 1 is described in FIG. 3.

A first signal generating unit 3 generates the noise elimination control signal by comparing the average power signal of the audio signal and the first threshold. The noise eliminating control signal is used to control noise eliminating amplification unit to eliminate noise in the audio signal. Wherein, the first threshold is a critical value between the voice signal average power and the noise average power. The voice signal or noise in the audio signal is determined by comparing the average power signal of the audio signal with the first threshold, thus to generate the noise eliminating control signal. The first signal generating unit 3 comprises a first comparison module 31 to extract a first control signal for an effective voice signal, a second comparison module 32 to extract a third control signal for an excessive audio signal, a compensation module 33 and a second logic processing module 34.

Wherein, the first comparison module 31 is used to extract a first control signal for an effective voice signal by comparing the average power signal of the audio signal with a fourth threshold.

Wherein, the fourth threshold is used to detect the effective voice signal, i.e., to set the noise threshold. The detailed setting of the fourth threshold depends on microphone sensitivity and collecting condition for different sound pressure noise based on the microphone sensitivity, and the detailed setting of the fourth threshold should combine with acoustic theory and experimental statistics. In this embodiment of the present invention, if the effective voice signal is detected, then the output is logic true; if the effective voice signal is not detected, then the output is logic false.

The compensation module 33 is used to compensate the first control signal of the effective voice signal to obtain the second control signal.

The second comparison module 32 is used to extract a third control signal for an excessive audio signal by comparing the average power signal of the audio signal with a fifth threshold.

Wherein, the fifth threshold is used to detect the effective voice signal, i.e., to set noise threshold. The detailed setting of the fourth threshold depends on microphone sensitivity and collecting condition for different sound pressure noise based on the microphone sensitivity, and the detailed setting of the fifth threshold should combine with acoustic theory and experimental statistics. In this embodiment of the present invention, if the excessive voice signal is detected, then the output is logic true; if the excessive voice signal is not detected, then the output is logic false.

The second logic processing module 34 is used to process the second control signal and the third control signal using the exclusive logic OR operation, then generate the noise eliminating control signal.

The amplifying unit 4 is used to eliminate the noise of the audio signal and amplify the voice signal of the audio signal.

There are many ways to eliminate the noise of the audio signal and amplify the voice signal of the audio signal, such as amplifying the audio signal to pre-determined times or prohibiting the audio signal from generating under the control of the noise eliminating control signal, performing phase processing for the audio signal to eliminate the noise and amplify the voice signal, etc. The present invention provides a specific structure of an amplifying unit 4, wherein the amplifying unit 4 comprises a controllable inverter 41, a first inverse phase follower 42, a second inverse phase follower 43, an inverse phase adder 44 and a low pass filter 45.

An excessive audio signal normally exists in the collected audio signal, which causes the listener to feel uncomfortable. To solve this problem, in some embodiment of the present invention, the background noise eliminating device further comprises a second signal generating unit 5 and an attenuation unit 6.

Wherein, the second signal generating unit 5 is used to generate an attenuation control signal by comparing the average power with a sixth threshold. The attenuation unit 6 is used to perform inverse phase amplification at different ratios for the received audio signal, and reduce an excessive audio signal.

Wherein the sixth threshold is the maximum power of an acceptable pre-determined audio signal. In some embodiment of the present invention, when the average power signal of the audio signal is larger than the sixth threshold, the output attenuation control signal is logic true; when the average power signal of the audio signal is less than or equal to the sixth threshold, the output attenuation control signal is logic false.

The attenuation unit 6 performs inverse phase amplification at different ratios for the received audio signal, and reduces an excessive audio signal.

In some embodiment of the present invention, when the volume of the audio signal is within a normal range, the attenuation control signal controls the received audio signal for equal amplitude and inverse phase amplification, i.e., the amplitude of the audio signal is not processed, and the inverse phase amplification signal is obtained; when the volume of the audio signal exceeds the normal range, the attenuation control signal attenuates the excessive audio signal in a certain ratio to reduce the excessive audio signal appropriately, and the inverse phase amplification signal is obtained.

Therefore, using the noise eliminating control signal, the amplifying unit 4 eliminates or amplifies the audio signal output by the attenuation unit 6, thus eliminates the noise of the inverse phase amplification audio signal and amplifies the voice signal of the inverse phase amplification audio signal.

Figure 3:
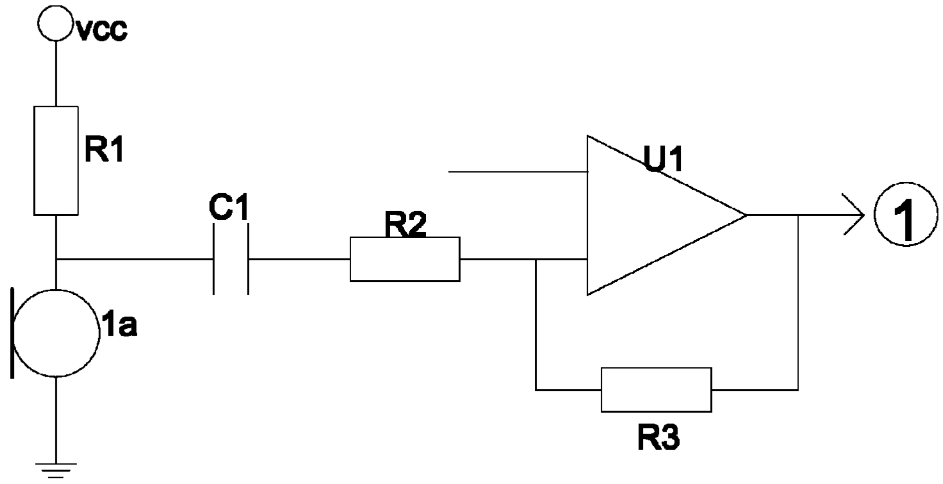
FIG. 3 is a circuit schematic diagram of an audio collecting unit in some embodiments of the present invention.

FIG. 3 shows a circuit schematic diagram of an audio collecting unit 1 in some embodiments of the present invention. The audio collecting unit 1 comprises voltage-dividing circuit, blocking circuit and inverse phase follower. The voltage-dividing circuit is consisted of a microphone 1*a* and a resistor R1, the blocking circuit is consisted of a capacitor C1, and the inverse phase follower is consisted of an operational amplifier U1, the resistors R1 and R2. The microphone is an omni-directional microphone, for example, the conventional microphone of communication equipment such as mobile phone; and the microphone is used to induce outside audio signal and transform the audio signal into electrical signal. The electrical signal of the microphone is processed via the blocking circuit, and the electrical signal is transformed into an alternating current signal, then signal 1 is output via the inverse phase follower.

Figure 4:
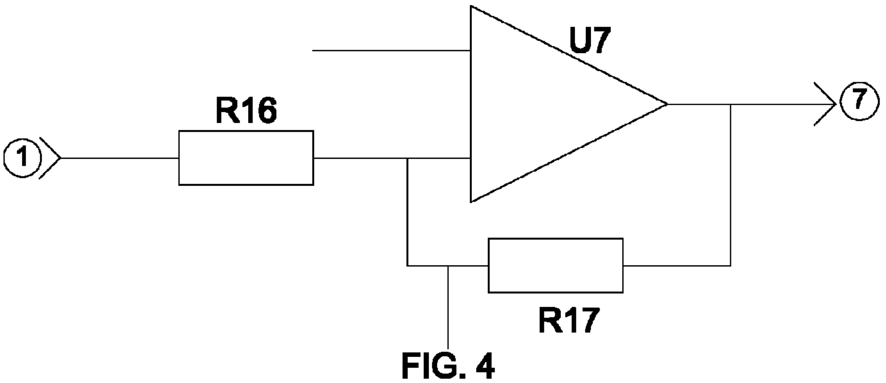
FIG. 4 is a circuit schematic diagram of a signal pre-amplifying circuit in some embodiments of the present invention.

FIG. 4 shows a circuit schematic diagram of a signal pre-amplifying circuit 21 in some embodiments of the present invention. The signal pre-amplifying circuit 21 comprises an operational amplifier U7, a resistor R16 connected to an input terminal of the operational amplifier U7, and a resistor R17 connected to the input terminal and the output terminal of the operational amplifier U7, respectively. According to the processing accuracy demand of an actual system, the signal pre-amplifying circuit 21 can adjust the proportions of the resistors R16 and R17 to pre-amplify signal 1 output by the signal collecting unit 1 and obtain the pre-amplified signal 7.

Figure 5:
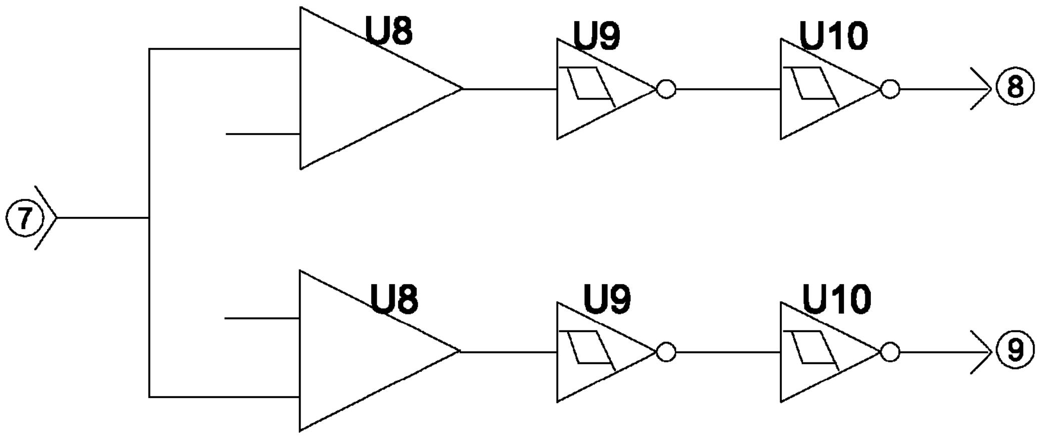
FIG. 5 is a circuit schematic diagram of a forward voice signal determining module and an inverse voice signal determining module in some embodiments of the present invention.

FIG. 5 shows a circuit schematic diagram of a forward voice signal determining module 221 and an inverse voice signal determining module 222 in some embodiments of the present invention.

Both the forward voice signal determining module 221 and the inverse voice signal determining module 222 comprises a comparator U8 and Schmitt inverters U9 and U10. The comparator U8 compares the audio signal 7 with a pre-determined first threshold, and then the Schmitt inverters U9 and U10 perform shape-correction process for the noise to obtain comparison result signal 8. The comparator U8 compares the audio signal 7 with a pre-determined second threshold, and then the Schmitt inverters U9 and U10 perform shape-correction process for the noise to obtain comparison result signal 9.

Figure 6:
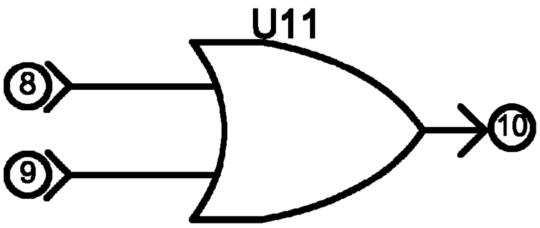
FIG. 6 is a circuit schematic diagram of a first logic processing module in some embodiments of the present invention.

FIG. 6 shows a circuit schematic diagram of a first logic processing module 223 in some embodiments of the present invention.

The first logic processing module 223 is consisted of a logic OR gate U11. The two input signals for the logic OR gate U11 are: the output signal 8 of the forward voice signal determining module 221, and the output signal 9 of the inverse voice signal determining module 222, respectively. When one of the output signal 8 and the output signal 9 is true, i.e., when one of the forward voice signal determining module 221 and the inverse voice signal determining module 222 determines the audio signal as a voice signal, the output signal 10 is output as logic true, after the process of the logic OR gate U11, i.e., the audio signal is determined to be a voice signal after the process of the logic OR gate U11. Otherwise, the audio signal is determined to be noise.

Figure 7:
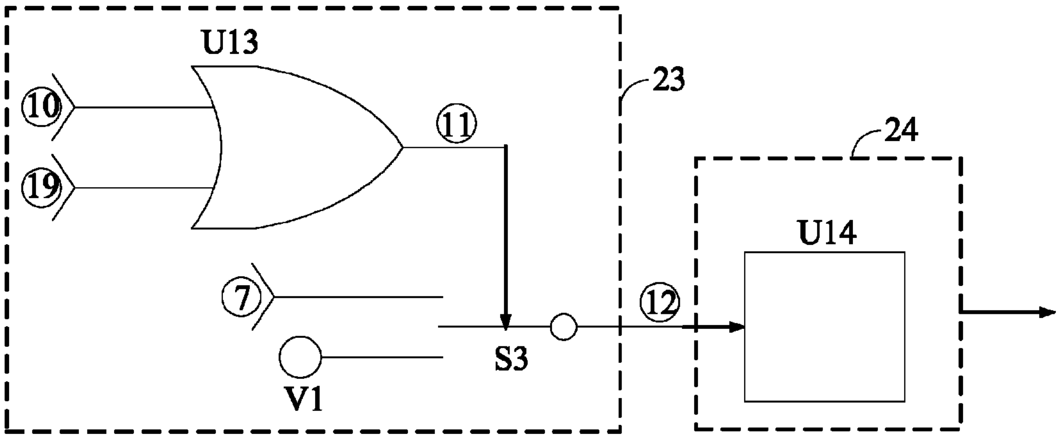
FIG. 7 is a circuit schematic diagram of a control circuit for detecting an effective value and a detecting circuit in some embodiments of the present invention.

FIG. 7 shows a circuit schematic diagram of an effective value detecting control circuit 23 and an effective value detecting circuit 24 in some embodiments of the present invention.

The effective value detecting control circuit 23 comprises a logic OR gate U13 and a two-to-one selection switch S3. The two input terminals of the logic OR gate U13 are connected to the output terminal of the first logic processing module 223 and the output terminal of the second logic processing module 34, respectively. The output signal of the logic OR gate U13 is used as the control signal of the two-to-one selection switch S3, The two-to-one selection switch S3 controls the effective value detecting circuit 24 to detect the effective value for the audio signal, thus to generate the average power signal of the audio signal; or not to detect the effective value and maintain the output signal V1 with the initial value.

The logic OR gate U13 performs logic OR process to the output signal 10 and the output signal 19 to obtain the control signal 11. The control signal 11 is used to control the two-to-one selection switch S3. And the control signal 11 controls the two-to-one selection switch S3 to switch between the output signal 7 and the pre-determined initial value V1 to obtain the output signal 12. Then the output signal 12 controls the effective value detection circuit 24 to detect the effective value for the output signal 7, thus to generate the output signal DD reflecting the average power of the audio signal; or not to detect the effective value and maintain the output signal V1 with the initial value.

Figure 8:
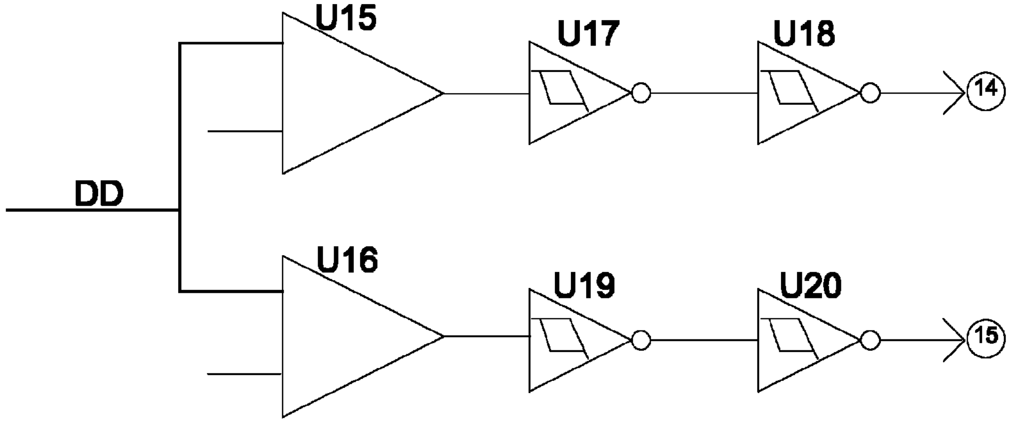
FIG. 8 is a circuit schematic diagram of a first comparison module and a second comparison module in some embodiments of the present invention.

FIG. 8 shows a circuit schematic diagram of a first comparison module 31 and a second comparison module 32 in some embodiments of the present invention.

The first comparison module 31 includes a comparator U15 and Schmitt inverters U17 and U18. The comparator U15 is used to compare the output signal DD with the pre-determined fourth threshold so as to extract the first control signal and output the first control signal 14 of the effective voice signal. Wherein the fourth threshold is mainly used to detect effective voice signal, i.e., to set the noise threshold. The detailed setting of the fourth threshold mainly depends on microphone sensitivity and collecting condition for different sound pressure noise based on the microphone sensitivity, and the detailed setting of the fourth threshold should combine with acoustic theory and experimental statistics. If the signal DD is larger than the fourth threshold, the output of the first comparison module 31 is logic true, which indicates a voice signal is detected; if the signal DD is less than or equal to the fourth threshold, the output of the first comparison module 31 is logic false, which indicates noise is detected.

The excessive signal comparison module 32 includes a comparator U16 and Schmitt inverters U19 and U20. The comparator U16 is used to compare the output signal DD with the pre-determined fifth threshold so as to extract the third control signal for the excessive signal and output the third control signal 15. During a voice conversation, interference noise is unavoidable, and a sudden excessive noise reduces the quality of speech. To solve this problem, the second comparison module 32 extracts the third control signal for the excessive signal, thus to eliminate the noise and make the listener comfortable.

Figure 9:
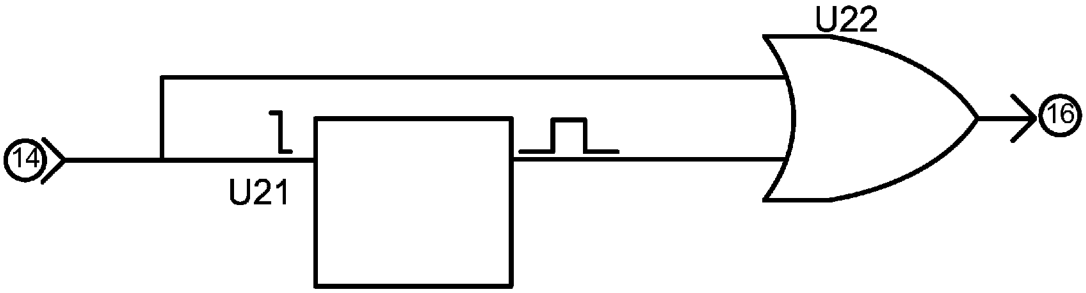
FIG. 9 is a circuit schematic diagram of a compensation module in some embodiments of the present invention.

FIG. 9 shows a circuit schematic diagram of a compensation module 33 in some embodiments of the present invention.

The control signal compensation module 33 includes a multi-frequency oscillator U21 and an OR gate U22. The multi-frequency oscillator U21 is used to detect a first pulse from the first comparison module 31. Once the multi-frequency oscillator detects a descending slope in the first pulse, the multi-frequency oscillator outputs a second pulse with a certain bandwidth. And the second pulse is broadened using the second control signal. Therefore, when it comes to the end of a conversation, the speech loss can be reduced and a high quality conversation can be revived.

Figure 10:
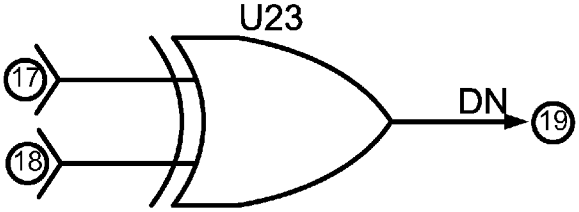
FIG. 10 is a circuit schematic diagram of a second logic processing module in some embodiments of the present invention.

FIG. 10 shows a circuit schematic diagram of a second logic processing module 34 in some embodiments of the present invention.

The second logic processing module 34 is consisted of a logic exclusive OR gate U23. The output signal 16 of the compensation module 33 and the output signal 15 of the second comparison module 32 are transmitted to the input terminals of the second logic processing module 34, respectively. These two signals forms the noise eliminating control signal 17 after processing using exclusive OR logic. And the noise eliminating control signal is used to eliminate the audio signal after being processed by the attenuation unit 6.

Figure 11:
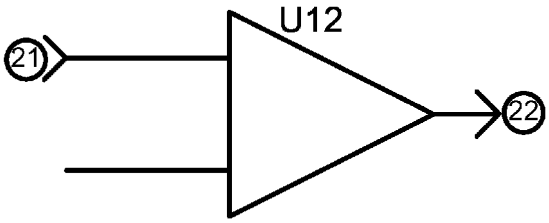
FIG. 11 is a circuit schematic diagram of a second signal generating unit in some embodiments of the present invention.

FIG. 11 shows a circuit schematic diagram of a second signal generating unit 5 to generate an attenuation control signal in some embodiments of the present invention.

The second signal generating unit 5 is consisted of a comparator U12. One input signal of the comparator U12 is the output signal DD of the effective value detection circuit 24, and the other input signal is a pre-determined sixth threshold. The comparator U12 compares the output signal DD with the pre-determined sixth threshold to generate the attenuation control signal 18. The attenuation control signal 18 is used to perform inverse phase amplification in different ratios for the audio signal. In the embodiment of this invention, when the average power signal of the audio signal is larger than the pre-determined sixth threshold, the generated attenuation control signal 18 controls the attenuation unit 6 to perform equal amplitude and inverse phase amplification for the audio signal, i.e., no attenuation process is performed for the amplitude of the audio signal; when the average power signal of the audio signal is less than or equal to the pre-determined sixth threshold, the generated attenuation control signal 18 controls the attenuation unit 6 to perform attenuation in a certain ratio to reduce excessive audio signal appropriately.

Figure 12:
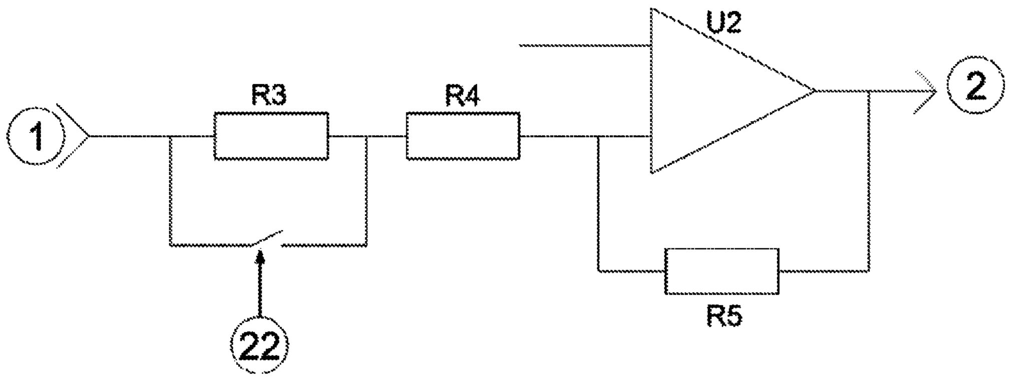
FIG. 12 is a circuit schematic diagram of an attenuation unit in some embodiments of the present invention.

FIG. 12 shows a circuit schematic diagram of an attenuation unit 6 in some embodiments of the present invention.

The attenuation unit 6 includes an operational amplifier U2, a control switch S1 and resistors R3, R4 and R5. Wherein the resistors R3 and R4 are in serially-connected, and are connected to the input terminals of the operational amplifier U2. The control switch S1 is in parallel with the resistor R3. And the resistor R5 is connected to the input terminal and the output terminal of the operational amplifier U2, respectively. The control signal of the control switch S1 is transmitted from the attenuation control signal 18 generated by the second signal generating unit 5. And the attenuation control signal 18 controls the ON/OFF switch, thus to perform inverse phase amplification in different ratios for the audio signal, and obtain the inverse phase amplification signal 2. In some embodiment of the present invention, when the volume of the audio signal is within a normal range, the attenuation control signal 18 controls the attenuation unit 6 to perform equal amplitude and inverse phase amplification for the audio signal, i.e., no process is performed for the amplitude of the audio signal to obtain the inverse phase amplification signal 2; when the volume of the audio signal exceeds the normal range, the attenuation control signal 18 controls the audio controllable attenuation unit 6 to perform attenuation in a certain ratio for the excessive audio signal, in order to reduce the excessive audio signal appropriately and obtain the inverse phase amplification signal 2.

Figure 13:
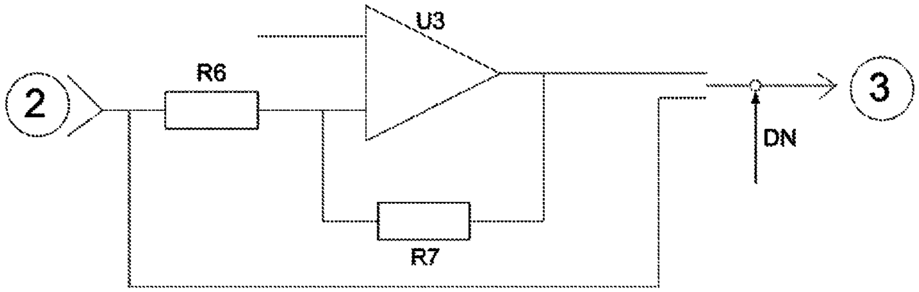
FIG. 13 is a circuit schematic diagram of a controllable inverter in some embodiments of the present invention.

FIG. 13 shows a circuit schematic diagram of a controllable inverter 41 in some embodiments of the present invention.

The two input terminals of the controllable inverter 41 are connected to the output terminal of the attenuation unit 6 and the output terminal of the second logic processing module 34, respectively. The controllable inverter 41 includes an operational amplifier U3, resistors R6 and R7 and a two-to-one selection switch S2. The resistor R6 is connected to one input terminal of the operational amplifier U3; the resistor R7 is connected to the input terminal and the output terminal of the operational amplifier U3, respectively; and using the noise eliminating control signal 17, the two-to-one selection switch S2 performs same phase process or inverse phase process to obtain the signal 3. When performing same phase process, the inverse phase amplification signal 2 will be improved to obtain the signal 3; when performing inverse phase process, the noise will be eliminated to obtain the signal 3.

Figure 14:
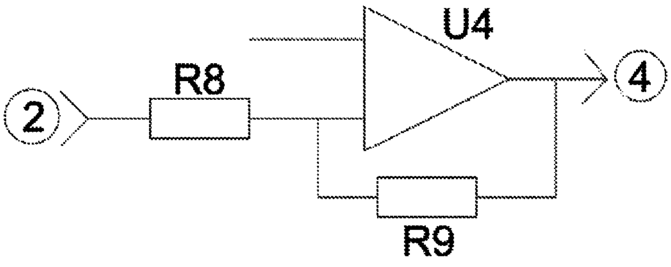
FIG. 14 is a circuit schematic diagram of a first inverse phase follower in some embodiments of the present invention.
Figure 15:
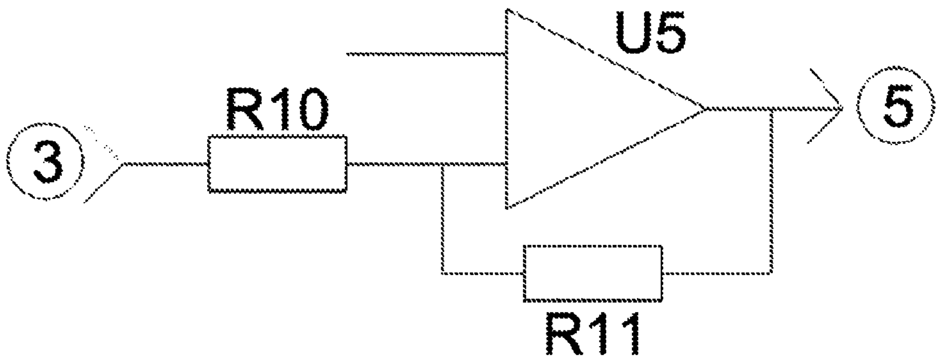
FIG. 15 is a circuit schematic diagram of a second inverse phase follower in some embodiments of the present invention.

FIGS. 14 and 15 show circuit schematic diagrams of a first inverse phase follower 42 and a second inverse phase follower 43 in some embodiments of the present invention.

The input terminal of the first inverse phase follower 42 is connected to the output terminal of the attenuation unit 6, and the output terminal of the first inverse phase follower 42 is connected to the input terminal of an inverse phase adder 44. The first inverse phase follower 42 includes an operational amplifier U4, a resistor R8 connected to one input terminal of the operational amplifier U4, and a resistor R9 crossover connected to the input terminal and the output terminal of the operational amplifier U4, respectively. The input signal of the first inverse phase follower 42 is the output signal 3 of the attenuation unit 6 and the output signal of the first inverse phase follower 42 is signal 4. The input terminal of the second inverse phase follower 43 is connected to the controllable inverter 41, and the output terminal of the second inverse phase follower 43 is connected to the input terminal of the inverse phase adder 44. The second inverse phase follower 43 includes an operational amplifier U5, a resistor R10 connected to one input terminal of the operational amplifier U5, and a resistor R11 connected to the input terminal and the output terminal of the operational amplifier U5, respectively. The input signal of the second inverse phase follower 43 is the output signal 3 of the inverse phase adder 44 and the output signal of the second inverse phase follower 43 is signal 5.

Figure 16:
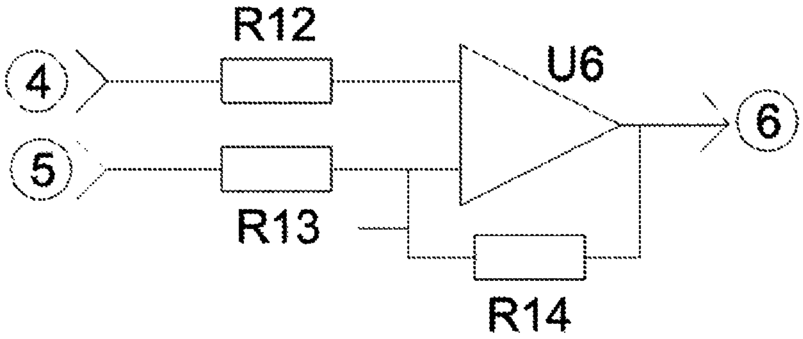
FIG. 16 is a circuit schematic diagram of an inverse phase adder in some embodiments of the present invention.

FIG. 16 shows a circuit schematic diagram of an inverse phase adder 44 in some embodiments of the present invention.

The two input terminals of the inverse phase adder 44 are connected to the output terminal of the first inverse phase follower 42 and the output terminal of the second inverse phase follower 43, respectively. The inverse phase adder 44 includes an operational amplifier U6, a resistor R12 connected to one input terminal of the operational amplifier U6, and a resistor R13 connected to the input terminal and the output terminal of the operational amplifier U6, respectively. The two input signals of the inverse phase adder 44 are the input signal 4 of the first inverse phase follower 42 and the output signal 5 of the second inverse phase follower 43, and the output signal of the inverse phase adder 44 is signal 6.

Figure 17:
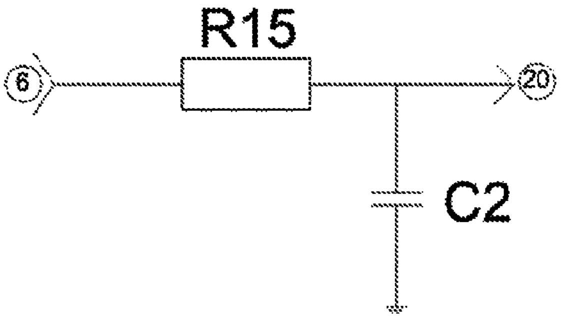
FIG. 17 is a circuit schematic diagram of a low pass filter in some embodiments of the present invention.

FIG. 17 shows a circuit schematic diagram of a low pass filter 45 in some embodiments of the present invention.

The input terminal of the low pass filter 45 is connected to the output terminal of the inverse phase adder 44. The low pass filter 45 includes a resistor R15 and a capacitor C2. The low pass filter 45 filters the noise outside the speech bandwidth and maintains the frequency component inside the speech bandwidth.

In some embodiments of the present invention, the average power signal the audio signal is obtained by detecting the effective value for a received audio signal; the noise eliminating control signal is generated by comparing the average power signal of the audio signal with the first threshold; and the noise of the audio signal is eliminated and the voice signal of the audio signal is amplified using the noise eliminating control signal, thus to eliminate background noise. At the same time, the attenuation control signal is generated by comparing the average power signal of the audio signal with the sixth threshold. Using the attenuation control signal, the received audio signal is performed inverse phase amplification at different ratios, in order to reduce an excessive audio signal and improve the quality of the conversation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of eliminating background noise, comprising steps of:

(a) detecting an effective value of a received audio signal, and generating an average power signal of the received audio signal using a detecting unit, wherein the receive audio signal includes noise and a voice signal;

(b) generating a noise eliminating control signal by comparing the average power signal from the detecting unit with a first threshold using a first signal generating unit, the first signal generating unit including a first comparison module, a second comparison module, a compensation module and a second logic processing module, the generating further comprising:

(b1) extracting a first control signal for an effective voice signal by comparing the average power signal from the detecting unit with a second threshold using the first comparison module;

(b2) generating a second control signal by compensating the first control signal from the first comparison module using the compensation module;

(b3) extracting a third control signal for an excessive audio signal by comparing the average power signal from the detecting unit with a third threshold using the second comparison module; and (b4) processing the second control signal from the compensation module and the third control signal from the second comparison module using exclusive logic OR, and generating the noise eliminating control signal using the second logic processing module; and (c) eliminating the noise in the received audio signal, and amplifying the voice signal in the received audio signal in accordance with the noise eliminating control signal from the second logic processing module using an amplifying unit;

wherein the first threshold is determined based on the difference between an average power of the voice signal and an average power of the noise.

2. The method of eliminating background noise according to claim 1, wherein the step (a) comprises steps of:

(a1) determining whether the received audio signal is a voice signal;

(a2) generating a trigger signal for detecting the effective value, based on the determination result and the noise eliminating control signal generated in a preceding elimination cycle; and (a3) detecting the effective value in response to the trigger signal, and generating the average power signal of the received audio signal.

3. The method of eliminating background noise according to claim 2, further comprises a step of pre-amplifying the received audio signal.

4. The method of eliminating background noise according to claim 2, wherein the step (a1) comprises steps of:

(a11) generating a forward comparison result by comparing the received audio signal with a second threshold;

(a12) generating an inverse comparison result by comparing the received audio signal with a third threshold;

(a13) processing the forward comparison result and the inverse comparison result using a logic OR operation to determine whether the received audio signal is a voice signal; and (a14) processing the result of step (a13) and the noise eliminating control signal generated in a preceding elimination cycle, and generating the trigger signal.

5. The method of eliminating background noise according to claim 1, further comprises steps of:

generating an attenuation control signal by comparing the average power signal with a fourth threshold; and attenuating an excessive audio signal properly using the attenuation control signal.

6. A device of eliminating background noise, comprising:

a detecting unit, which is configured to detect an effective value of a received audio signal, and generate an average power signal of the received audio signal, wherein the receive audio signal includes noise and a voice signal;

a first signal generating unit, which is configured to generate a noise eliminating control signal by comparing the average power signal from the detecting unit with a first threshold, the first signal generating unit including a first comparison module, a second comparison module, a compensation module and a second logic processing module, wherein:

the first comparison module is configured to extract a first control signal for an effective voice signal by comparing the average power signal from the detecting unit with a second threshold;

the compensation module is configured to generate a second control signal by compensating the first control signal from the first comparison module;

the second comparison module is configured to extract a third control signal for an excessive audio signal by comparing the average power signal from the detecting unit with a third threshold; and the second logic processing module is configured to process the second control signal from the compensation module and the third control signal from the second comparison module using exclusive logic OR, and generating the noise eliminating control signal; and an amplifying unit, which is configured to eliminate the noise in the received audio signal, and amplify the voice signal in the received audio signal in accordance with the noise eliminating control signal from the second logic processing module;

wherein the first threshold depends, at least in part, on the difference between an average power of the voice signal and an average power of the noise.

7. The device of eliminating background noise according to claim 6, wherein the detecting unit further comprises:

a determining circuit, which is configured to determine whether the received audio signal is a voice signal;

a control circuit, which is configured to generate a trigger signal for detecting the effective value of the received audio signal, after processing the determination result and the noise eliminating control signal generated in a preceding elimination cycle; and a detecting circuit, which is configured to detect the effective value in response to the trigger signal, and generate the average power signal of the received audio signal.

8. The device of eliminating background noise according to claim 7, wherein the detecting unit further comprises:

a pre-amplifying circuit, which is configured to pre-amplify the received audio signal, wherein the output terminals of the pre-amplifying unit are configured to connected to the determining circuit and the detecting circuit, respectively.

9. The device of eliminating background noise according to claim 7, wherein the determining circuit further comprises:

a forward determining module, which is configured to generate a forward comparison result by comparing the received audio signal with a second threshold;

an inverse determining module, which is configured to generate an inverse comparison result by comparing the received audio signal with a third threshold; and a first logic processing module, which is configured to process the forward comparison result and the inverse comparison result, and determine whether the received audio signal is a voice signal.

10. The device of eliminating background noise according to claim 9, wherein the forward determining module and the inverse determining module comprise a plurality of comparators and Schmitt inverters.

11. The device of eliminating background noise according to claim 7, wherein the control circuit further comprises a logic OR gate and a two-to-one switch, wherein an output terminal of the logic OR gate is configured to be connected to the two-to-one switch.

12. The device of eliminating background noise according to claim 6, wherein the compensation module further comprises:

a multi-frequency oscillator, which is configured to detect a first pulse from the first comparison module, and generate a second pulse with a certain bandwidth when a descending slope in the first pulse is detected; and a logic OR gate, which is configured to broaden the second pulse using the second control signal.

13. The device of eliminating background noise according to claim 6, further comprises:

a second signal generating unit, which is configured to generate an attenuation control signal by comparing the average power audio signal with a fourth threshold; and an audio attenuation unit, which is configured to attenuate an excessive audio signal properly using the attenuation control signal.

14. The device of eliminating background noise according to claim 6, wherein the amplifying unit further comprises:

a first inverse phase follower;

a controllable inverter;

a second inverse phase follower;

an inverse phase adder; and a low pass filter;

wherein an output terminal of the controllable inverter is configured to connect to the second inverse phase follower, and the inverse phase adder is configured to connect to the first inverse phase follower, the second inverse phase follower, and the low pass filter, respectively.

* * * * *